No. 635,836. Patented Oct. 31, 1899.
H. C. ZIEGENHORN & S. C. GUINGRICH.
SEED SOWER.
(Application filed Dec. 8, 1898.)
(No Model.)
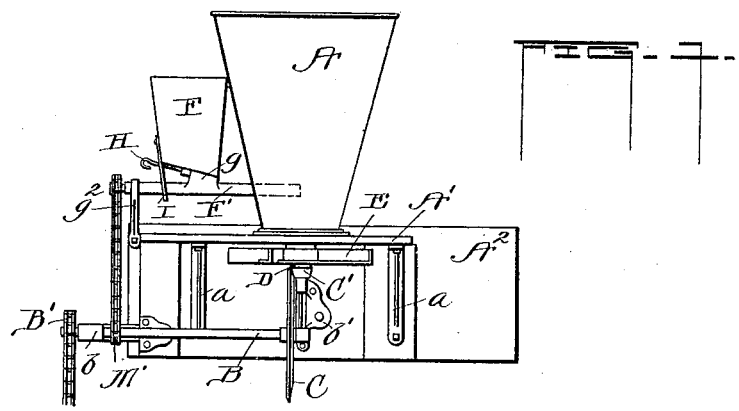
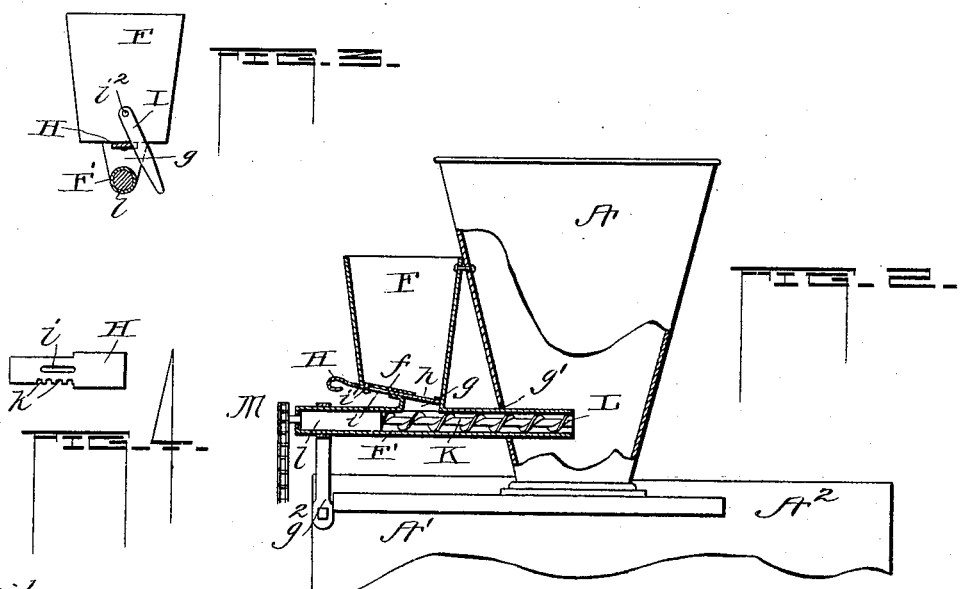
Witnesses:
A. E. Francis
Chos. J. La Porte
Inventors:
Henry C. Ziegenhorn
Samuel C. Guingrich
by W. V. Jeffs
Atty.

UNITED STATES PATENT OFFICE.

HENRY C. ZIEGENHORN AND SAMUEL C. GUINGRICH, OF EAST LYNN, ILLINOIS.

SEED-SOWER.

SPECIFICATION forming part of Letters Patent No. 635,836, dated October 31, 1899.

Application filed December 8, 1898. Serial No. 698,617. (No model.)

*To all whom it may concern:*

Be it known that we, HENRY C. ZIEGENHORN and SAMUEL C. GUINGRICH, citizens of the United States, residing at East Lynn, in the county of Vermilion and State of Illinois, have invented certain new and useful Improvements in Seed-Sowers; and we do hereby declare that the following is a full, clear, and exact description of the invention, which will enable others skilled in the art to which it appertains to make and use the same.

Our invention relates to that class of seed planting or sowing machines known in the art as "broadcast," or those wherein the seed is thrown in every direction and adapted to fall upon the ground to be sown.

More particularly, our invention relates to the class of seed-sowers designed to be attached to the rear part of a wagon and driven by means of a sprocket-wheel attached to one of the wagon-wheels and which may be attached to the ordinary style of seed-sowers or to that class of sowers known in the art as "force-feed" sowers. The operation and application of the device are in no wise limited, as it may be used in combination with any known "sower" now in use.

Our invention also has for its object to provide a novel seeding-machine wherein there is provided an auxiliary hopper and feeder adapted to be attached to the ordinary "seeder-hopper" purposed to deliver to the distributer simultaneously with the grain-seed to be planted any mixture of seed, such as "grass" or "clover" seed, the further purpose of which is to save the time and expense incident to a second trip over the field to plant any additional kind of seed.

The invention also has for its object to provide a novel means for conveying the seed from the auxiliary hopper and for controlling the quantity to be delivered therefrom.

To accomplish these objects, our invention involves the features of construction and combination and arrangement of parts hereinafter described and claimed, reference being made to the accompanying drawings, in which—

Figure 1 is a view in elevation of the seed-sower, looking toward the rear end of the wagon and showing the rear end-board of wagon to which it is attached. Fig. 2 is an enlarged elevation showing several of the corresponding parts as seen in Fig. 1, but here shown in vertical section. Figs. 3 and 4 are details of our improvement as illustrated in Figs. 1 and 2.

In order to enable those skilled in the art to make and use our invention, we will now describe the same in detail, referring to the drawings.

To describe fully and to bring out clearly the novel and valuable features contained in our invention, it is necessary to embody in the drawings an illustration of one form of sower to which our device is applicable, it of course being understood that it is applicable to any style of sower.

A indicates a hopper or box of any desired form or shape and constructed in any suitable manner, so that it may receive and contain a quantity of seed which is to be distributed or planted in a field. The hopper is suitably mounted on the shelf or frame part A', which is supported on the rear end-board $A^2$ by the brackets $a\ a$.

B is the drive-shaft journaled in the brackets $b\ b'$, both of which are attached to the rear end-board $A^2$ of the wagon. The shaft B carries on its outer end the sprocket-wheel B', which is adapted to be actuated from a sprocket-wheel carried on one of the wagon-wheels through suitable chain connection. Said shaft carries on its inner end the bevel-wheel C, adapted to mesh with the pinion C' on the vertical shaft D, which is also journaled at one end of the bracket $b'$. The shaft D has suitably fixed thereon the rotary distributer E, as shown, a slide-valve being carried in the bottom of the hopper A, (not shown,) adapted to regulate and control the quantity of grain to be conducted to the distributer. We have not thought it necessary to show these several parts in detail, as they are commonly used on all sowers, but to describe the same sufficiently to show the relation our improvement bears in conjunction therewith.

F is an auxiliary hopper, which may be of any form or size and is provided with the bottom $f$.

F' is a tubular casing and is connected with the hopper F through the neck $g$, depending from the bottom $f$ of the hopper. One end of the tube projects into the hopper A at or near its base, as shown, and has a bearing relation therewith, as at $g'$, in the wall thereof. The opposite or outer end of the tube is supported in the bracket $g^2$, which is attached to the rear end-board, as shown. The auxiliary hopper at its upper end is shown bolted to the hopper A.

The several means here shown for supporting the auxiliary hopper and feeder are simple and sufficient; but other means may be employed which would serve the purpose just as well.

On the bottom of the hopper a slide or valve is shown at H and is adapted to control the quantity of seed to be conducted to the feeder which passes from the hopper through the opening $h$ into the neck $g$ and from thence to the feeder and then deposited into the hopper A. The valve H is provided with the centrally-disposed elongated slot $i$, through which a pin $i'$ projects, and is for the purpose of holding the same in perfect alinement and prevents the valve or slide from being slipped entirely out.

To regulate and hold the valve or slide in its proper relation and to insure only a certain amount of seed escaping from the hopper, a lever I is provided pivoted to the hopper, as at $i^2$, and is adapted to engage one of a series of slots $k$, provided on a portion of the length of one side of the valve, thus enabling the valve to be opened only a portion or the whole width of the opening $h$ in the hopper-bottom and be retained in such position.

The feeder above referred to, which is provided in the tubular casing, consists of the shaft K, enlarged at $l$, which provides a bearing for the same with the inner face of the tube.

L is a spiral conveyer provided on a portion of the length of the shaft K, as shown, and is adapted to receive and deliver the seed conducted from the hopper above to a point somewhat central and near the bottom in the hopper A, where the two kinds of seeds are mixed and delivered simultaneously to the distributer beneath the hopper and spread broadcast over the field.

The outer end of the shaft K is provided with the sprocket-wheel M, which is actuated through suitable chain connection from a similar sprocket-wheel M', carried on the drive-shaft B.

In the operation grain is placed in the hopper A, and the style of seed which is desired to be distributed therewith is placed in the hopper F, and the valve in the bottom thereof is opened the desired width. As the wagon to which the device is attached moves forward the drive-shaft is actuated, as stated, and in turn drives the distributer E and the spiral conveyer L. The grain and seed thus begin their onward course and are delivered to the distributer, which rotating distributer scatters it rearward on the field.

Having thus fully described our invention, what we claim, and desire to secure by Letters Patent, is—

1. The combination with a broadcast seeder arranged substantially as specified, of a supplemental hopper carried adjacent to and provided with an intermediate conveyer communicating with a main seeding-hopper, all substantially as herein shown and described.

2. In a broadcast seeder, the combination of a main seeding-hopper and the means for distributing the grain delivered therefrom, a supplemental hopper carried adjacent thereto, of a feeder interposed between said hopper and communicating with the same, in the manner and for the purpose described.

3. In combination with a seeding-hopper, of a broadcast seeder, a hopper carried independent thereof, a feeder consisting of a spiral conveyer connecting the main seeding-hopper with the supplemental hopper and of a valve carried in the supplemental hopper controlling the flow of seed therefrom, all substantially as described and shown.

4. In a broadcast seeder, the combination with a main seeding-hopper, of the supplemental hopper F, provided with the neck $g$, the tubular casing F', depending from said neck and communicating with the main hopper and provided with a conveyer therein actuated by suitable mechanism and of a valve carried in the hopper F, all substantially as and for the purpose described.

In testimony whereof we affix our signatures in presence of two witnesses.

HENRY C. ZIEGENHORN.
SAMUEL C. GUINGRICH.

Witnesses:
ED. HAAB,
WM. HANTZEL.